July 9, 1968 E. R. ANDERSON 3,391,769
FEEDING OF FRUIT AND VEGETABLE ARTICLES
Filed June 22, 1966 3 Sheets-Sheet 1
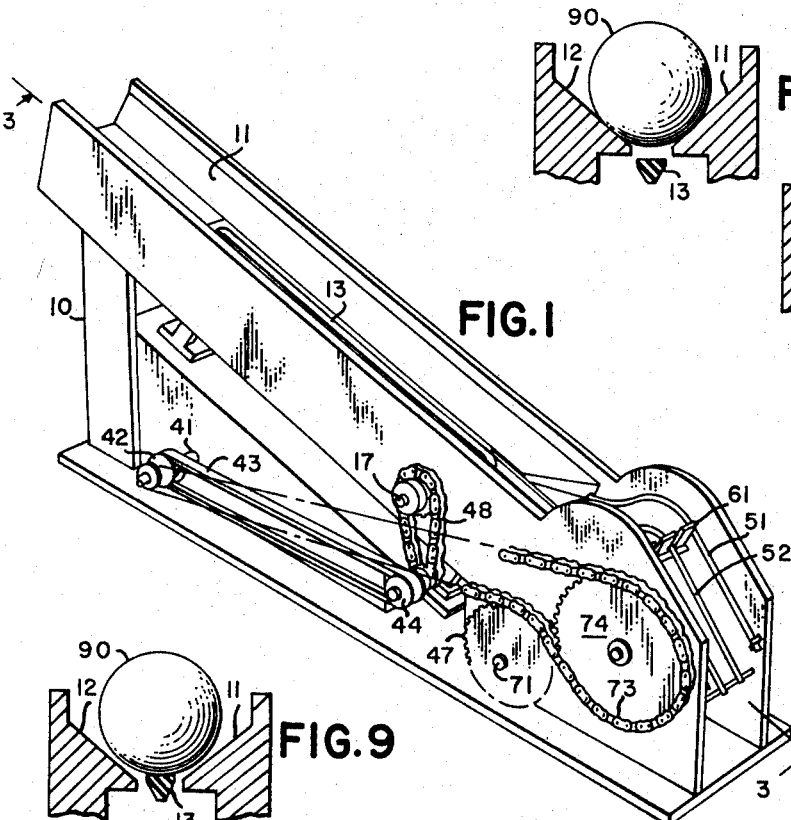
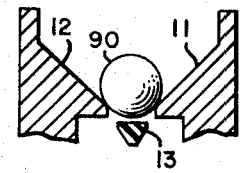
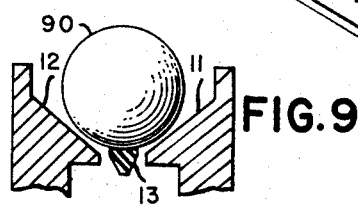
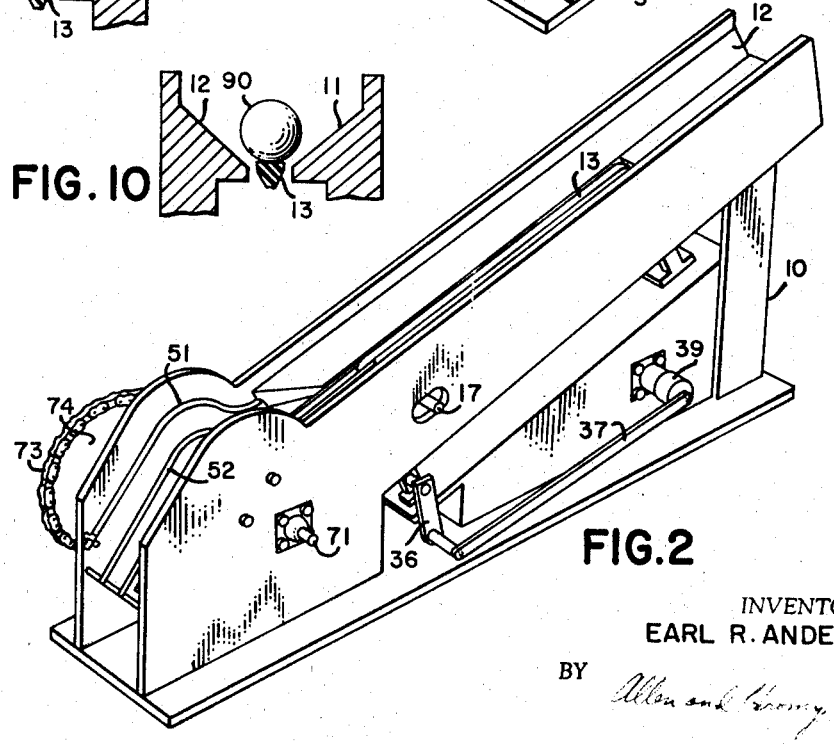
INVENTOR.
EARL R. ANDERSON
BY
ATTORNEYS

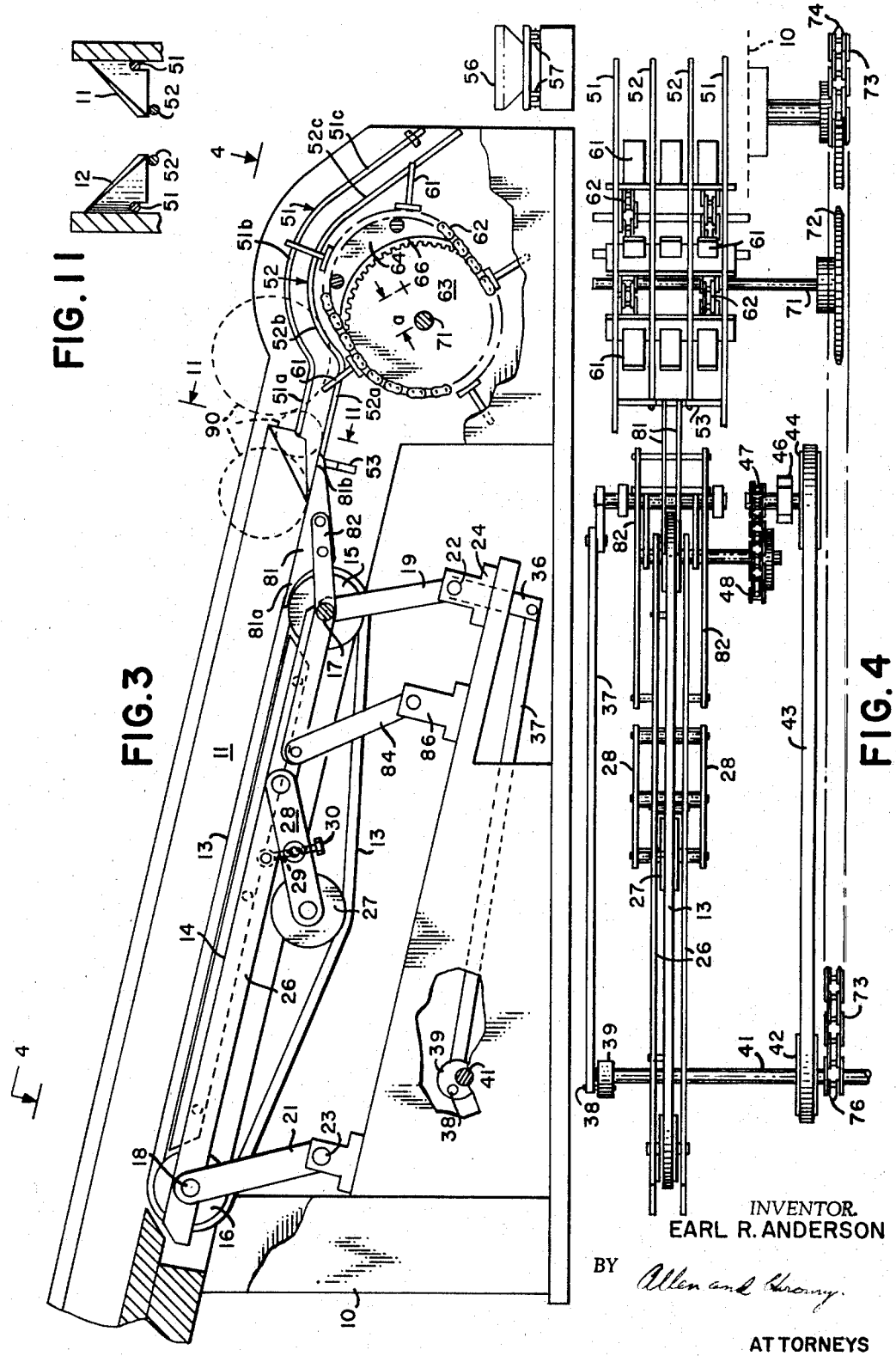

July 9, 1968  E. R. ANDERSON  3,391,769
FEEDING OF FRUIT AND VEGETABLE ARTICLES
Filed June 22, 1966  3 Sheets-Sheet 3

INVENTOR.
EARL R. ANDERSON
BY
ATTORNEYS

United States Patent Office 3,391,769
Patented July 9, 1968

3,391,769
FEEDING OF FRUIT AND VEGETABLE ARTICLES
Earl R. Anderson, Los Gatos, Calif., assignor to Philip Harper Allen, Saratoga, Calif.
Filed June 22, 1966, Ser. No. 560,966
15 Claims. (Cl. 193—1)

ABSTRACT OF THE DISCLOSURE

Feed apparatus for maintaining an unlocked condition in a single file of rollable articles, such as fruit and vegetables, wherein the articles in a single file in a feed trough are periodically lifted and are moved reversely toward the feed end of the trough so as to provide a separation between the line of articles in the trough and a small group of the articles in a feeding position. Also, at the discharge end of the trough a special bridge is formed between the trough and the pickup mechanism to insure the feeding of fruit and travel of the pickup mechanism is controlled to determine straight line movement of the pickup flights to insure efficient pickup of a small article adjacent to a large one or vice versa.

---

The present invention relates to the feeding of fruit and vegetable articles to maintain a single file of articles of different sizes in a separated or "unlocked" condition so as to prevent interference with the feeding of the articles by the locking of two articles together, which might be caused, for example, by as many as three round abutting articles on a relatively low inclined trough because the frictional engagement of the articles prevents rolling of the articles down the trough. Such locking can also be caused by the stems of fruit such as pears and apples, or by abutment of two relatively flat-sided articles.

It is a general object of the invention to provide a fruit feed for producing an article-by-article feed of the fruit from a row without the possibility of the row becoming locked and interfere with efficient feeding thereof.

A further object of the invention is to provide a fruit feed wherein a single file of articles is lifted from the supporting trough or members and moved in a reverse direction along the path to produce a separated relation between the articles in the file.

Another object of the invention is to provide a fruit feed wherein a single file of articles is periodically lifted off of its supporting trough or members and is reversed in its direction of movement so as to produce separation, while leaving free a small group of articles for the article-by-article feed from the end of the trough.

Another object of the invention is to provide a feed attaining the foregoing objects, in which a one-by-one feed of the articles can be effected successfully with articles of widely varying size, for example, articles varying in size from two inches in diameter to four inches in diameter.

A further object of the invention is to provide an improved pickup mechanism for removing articles one-by-one from the end of a feed path wherein the pickup is effected during a straight line travel of the pickup member or blade.

A further object of the invention is to provide a feed device of the above character wherein a transfer member has its position controlled so that its discharge end remains substantially constant in elevation while its feed end lifts with the lifting and separating conveyor.

The above and other objects of the invention are attained as described in the accompanying specification, taken in connection with the attached drawing, in which:

FIG. 1 is a perspective view of a feed apparatus for a single file of articles embodying the instant invention;

FIG. 2 is a perspective view seen from the other side of the apparatus;

FIG. 3 is a longitudinal sectional view through the apparatus taken as indicated by the line 3—3 in FIG. 1;

FIG. 4 is a plan view of the apparatus with certain parts removed for clarification of the view;

FIG. 6 is a sectional view taken as indicated by the line 6—6 in FIG. 5;

FIG. 7 is another fragmentary cross sectional view taken in the plane indicated by the lines 7—7 in FIG. 5;

FIG. 9 is a sectional view taken as indicated by the line 9—9 in FIG. 8;

FIG. 10 is a sectional view taken as indicated by the line 10—10 in FIG. 8;

FIG. 11 is a transverse sectional view taken in the plane indicated in the line 11—11 in FIG. 3.

Figure 5:
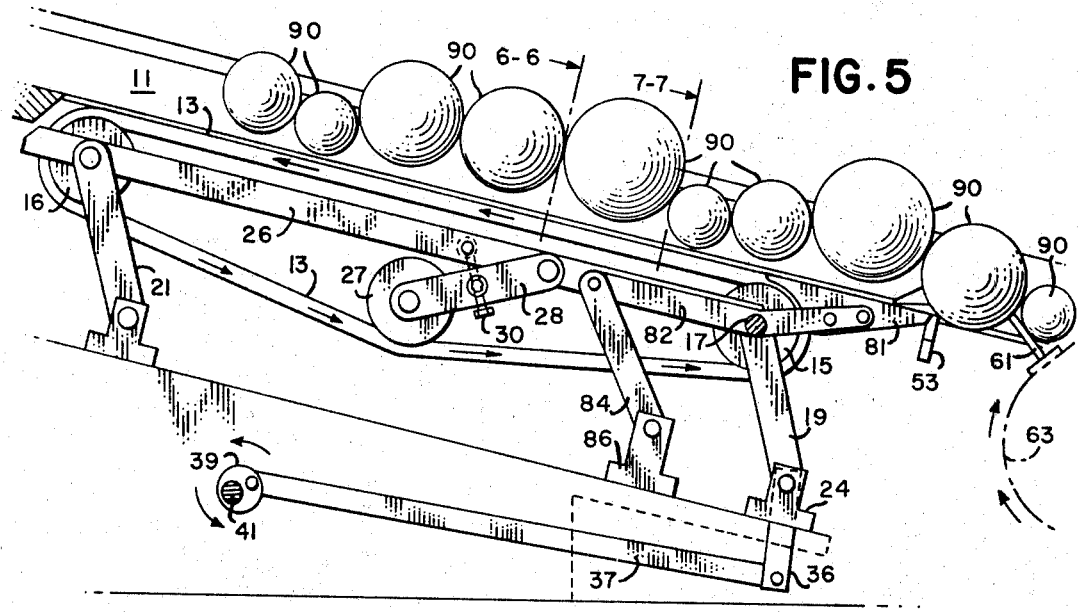
FIG. 5 is an operational view showing the feed apparatus in position similar to that shown in FIG. 3 with the reverse driving conveyor at the bottom of the trough shown in its lowered or ineffective position.

Referring first to FIGS. 1, 2 and 3 the illustrated embodiment of the present invention includes a frame 10 upon which an inclined V-shaped feed trough of stationary character is provided by side elements 11 and 12. The V-shaped trough formed by the trough members 11 and 12 has its bottom open, and positioned in cooperation with this bottom opening is a lifting and separating conveyor 13 having its upper stretch traveling over a supporting strip 14 to maintain a uniform condition of this stretch. The conveyor 13 is supported on a driving sprocket 15 and an idler sprocket 16 which are journaled on shafts 17 and 18 supported in respective sets of parallel arms 19 and 21 which are pivotally mounted respectively at 22 and 23 in respective pivot blocks 24 mounted on the frame of the machine. Respective frame bars 26 are provided at either side for supporting of the center strip 14, and these side bars 26 also mount an idler take-up roller 27 supported by a pair of arms 28 pivoted on the members 26 and having a spring 29 urging it outwardly against the lower stretch of the belt 13. A screw 30 serves to adjust the tension of the spring 29.

The separating and lifting conveyor 13 in the bottom of the trough is periodically lifted by means including an arm 36 depending from one end of the shaft 22 and pivoted to a link 37 having a pivotal connection at 38 with an eccentric cam 39 carried by a drive shaft 41 suitably journaled in the frame and extending outwardly for connection to a suitable motor (not shown). The drive shaft 41 carries a pulley 42 (FIGS. 1 and 4) which is connected by a belt 43 with a pulley 44 on a shaft 45 journaled in a frame bracket 46, and this shaft 45 carries a sprocket 47 engaged by a drive chain 48 which extends up to and about a sprocket 49 on the drive shaft 17. The shaft 17 extends through a slotted opening in the frame so as to be free to rock with its supporting arm 19 and the parallel supporting arms 21 during the lifting and lowering movement of the conveyor 13 while the sprocket 49 and the shaft 17 are transmitting the drive to this conveyor.

Associated with the trough and the pickup and separating conveyor 13 is a pick-off or transfer device for separating the endmost article or fruit from the remainder and discharging it for subsequent feeding to a suitable processing device. This pickup and discharge device includes four spaced rails including an outer pair 51 (FIGS. 3 and 4) an inner and lower pair 52 which are connected by a rod 53 adjacent their feed end and a second supporting spacing rod 54 intermediate their ends. These rails 51 and 52 include straight portions 51a and 52a at the feed end thereof to receive the food articles from the trough, arcuate portions 51b and 52b along which a lifting of the article to be discharged is effected, and final straight discharge portions 51c and 52c leading to a suitable receptacle for a discharged article, such as a cup 56 supported by a conveyor 57. The junction of the straight portions 52a and the curved portions 52b provide a seat or abutment for the endmost article to define a point of lift-off from the straight path of travel of the article leaving the trough. The rails 51 and 52 define a curved discharge path which extends over a part of the path of a series of flights or pickup blades 61, which are slotted to pass the rails 51 and 52 and which are carried by a pair of conveyor chains 62. The chains 62 travel over respective sprocket 63 and a stationary guide member 64 having an arcuate guide surface 66 which conforms to the curvature of the sprockets 63 and is parallel thereto so that the conveying chain is provided with a straight path portion "a" for travel of the flights 61 at the point of pick-off of the fruit, i.e., at the pick-off station where the flight 61 at this station extends perpendicularly from the chain and is of a length to be effective to pick off the smallest fruit as seen in FIG. 3, for example, say a fruit of two inches in diameter, and the largest fruit which would be handled as seen in FIG. 6 where a fruit of effective diameter of four inches is provided at the pick-off point, and the center of gravity of the article lies to the right of the end of the lifting flight 61.

The support shaft 71 (FIGS. 1, 3 and 4) for the two sprockets 63 is suitably journaled in the frame and extends beyond the frame at one side to mount a drive sprocket 72 engaged by the lower stretch of a chain 73 which travels over an idler sprocket 74 suitably mounted on the frame and also over a drive sprocket 76 carried by the shaft 41 (FIG. 4). The travel of the pick-off fingers or plates 61 is therefore in timed relation to the oscillation of the separating conveyor 13 from its inactive position shown in FIG. 5 to its active position as shown in FIG. 6.

Associated with the pick-off means and the feed conveyor or feed trough is a transfer and feed member in the form of a pair of spaced-apart plates 81 (FIGS. 3 and 4) which extend from adjacent the lower end of the conveyor 13 to the ends of the lower rails 52 where they terminate immediately above the transverse supporting plate 53 for these guide rails. The two transfer plates 81 are supported by a pair of straps 82 which are pivoted on the transverse drive shaft 17 and are pivotally connected to a pair of control arms 84 which are pivoted thereto and to a pair of support blocks 86 on the frame. The arms 84 are the same length as the arms 19 but have their pivot axis slightly elevated so that they perform a lifting action on the ends of the transfer plates 81, being so proportioned that the combined lifting movement on the plates 81 by the links 84 and links 19 produces a straight line feeding movement of the end 81b to cause it to move in parallel fashion with respect to the straight portions 52a of the rails 52. This straight line movement toward the seat or abutment for a fruit article effects a feeding movement on the fruit to carry it against the curved portion 52b of the guide rails. This reciprocation of the feed and transfer member 81 is in timed relation to the travel of the flights 61 to provide one reciprocation just ahead of movement of a flight 51 into position to effect a lifting operation.

Figure 8:
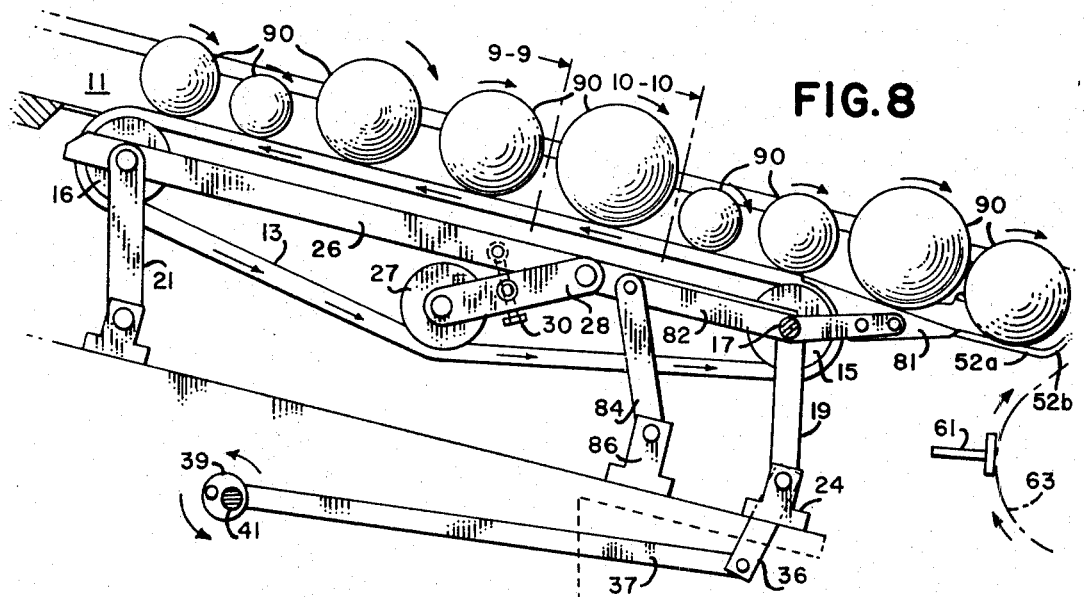
FIG. 8 is a view similar to FIG. 5, but showing the reversing conveyor in elevated position actively spacing the articles apart thereon while at the same time imparting a rotation to the articles in the desired direction of travel to cause them to quickly travel down the supporting trough when the lifting conveyor is again lowered.

In operation, the articles 90 such as apples, apricots, peaches or pears may be in the position shown in FIG. 5 in a single file and in abutting relation, the lifting and reversing conveyor 13 being disposed sufficiently below the trough formed by the trough members 11 and 12 so as to not affect the articles. The endmost article 90 is being lifted by a blade 61 and will be carried over the discharge path and deposited in the receptacle cup 56 of the conveyor 57. When the lifting and reversing conveyor 13 is raised to its active position as shown in FIG. 8, the articles engaged thereby are moved to the left and are separated. The belt 13 in driving them to this separated condition, also imparts a clockwise rotation to them. When the row of articles is again allowed to engage the trough formed by the trough members 11 and 12 they are rotating in a clockwise direction as stated, and move rapidly down to form again a continuous file and to replace the article which has been lifted by the active blade 61. This active blade as see in FIG. 5, for example, has an inclination of about 54° from horizontal and it is starting its travel along its straight line path "a" previously referred to. The length of the flight 61 is so selected that it will pass the next abutting article whether it be large or small without disturbing it and lift just the one article in the pocket 58 ready to be lifted. The length of the active portion of the flight 61 is so selected that the largest article 90 to be lifted will have its center of gravity disposed slightly to the right of the end of the flight 61 when the flight 61 first engages it to start a lifting operation.

This cycle of operation is repeated, the lifting and separating conveyor periodically raising the articles off the trough, moving them up the trough in reverse direction and separating them so as to break any locking relation between adjacent articles which may occur, for example, by as many as three round abutting articles on a relatively low inclined trough because the frictional engagement of the articles prevents rolling of the articles down the trough. It will be appreciated that with abutting articles the abutting surfaces must move oppositely for any rolling action. Such locking can also be caused because of the engagement of the flat sides of the articles with each other, or of engagement of the stems of the articles.

While the trough is shown as comprising stationary inclined trough members 11 and 12, these trough members could be replaced by rotating rolls either idle or driven as desired.

While I have shown and described a preferred embodiment of the invention, it is apparent that the invention is capable of variation and modification so that the scope thereof should be limited only by the proper scope of the claims appended hereto.

I claim:

1. The method of feeding a single file of articles such as fruit articles, which comprises supporting a single file of articles in a path, periodically lifting the articles from their support in said path and moving them reversely with respect to their normal direction of movement along said path, then lowering the articles again into engagement with their support in said path, and removing the endmost article from the file.

2. The method of feeding a single file of articles such as fruit articles, which comprises supporting a single file of articles in a path, effecting separation of the articles from each other to remove or break any locking relation between adjacent articles in said file, then causing re-engagement of the articles as an abutting file, and periodically removing the endmost article from the file.

3. The method of feeding a single file of articles such as fruit articles, which comprises supporting a single file of articles in a path, periodically moving the articles reversely with respect to their normal direction of movement along said path, and then effecting movement of the articles in said normal direction, and periodically removing the endmost article from the file.

4. A method of feeding a single file of articles such as fruit articles, which comprises supporting a single file of articles in a path, separating a group of articles at the discharge end of the path from the remaining articles by moving the remaining articles away from said group, and removing the endmost article of the group.

5. A method as recited in claim 4, which includes effecting separation of said remaining articles from each other during said separation thereof from said group.

6. A method of feeding a single file of articles such as fruit articles, as recited in claim 5 which includes moving said remaining articles toward said discharge end to again engage said articles with each other as a file.

7. A method of feeding a single file of articles such as fruit articles, which comprises supporting a single file of articles in a downwardly inclined path, periodically separating a group of articles at the discharge end of the path from the remaining articles by lifting the articles from their support and moving the remaining articles rearwardly along the path and imparting a spin to said remaining articles in a direction to effect forward movement along the path, feeding the endmost article of the file, and re-engaging said remaining articles with their support and thereby effecting forward feeding movement thereof.

8. In a feed apparatus for a single file of articles, such as fruit articles, means providing a trough to support a single file of articles, said trough having a feed end and a discharge end, means for picking up and discharging said articles, and means disposed in cooperative relation with said trough for effecting separation of the articles in the trough in the two groups including a small group of two or three articles at the pickup station and a larger group thereby relieving pressure of a full line of articles on the endmost article ready for pickup in said small group.

9. In a feed apparatus for a single file of articles, as recited in claim 8 in which said article separating means comprises means for moving articles operatively related thereto toward said feed end.

10. In a feed apparatus as recited in claim 8 including a transfer member disposed between said trough and said picking up and discharging means for supporting articles, said transfer member acting as a bridge between the discharge end of said trough and said means for picking up and discharging articles.

11. In a feed apparatus as recited in claim 10 in which said transfer member is mounted for reciprocation lengthwise of the trough to effect an article feeding action in time with the operation of said picking up and discharge means.

12. In a feed apparatus for a single file of articles, such as fruit articles as recited in claim 9, in which control means is provided for periodically bringing said moving means into play for effecting said separation of the articles and for imparting a spin to the articles in a direction to cause travel thereof toward said discharge end of said trough.

13. In a feed apparatus for a single file of articles, such as fruit articles as recited in claim 12, which includes lifting means for said moving means when active whereby said moving means operates to lift the articles thereabove.

14. In a feed apparatus for feeding a single file of articles, a frame, trough means on said frame having a feed end and a discharge end of said trough means including rail members defining a discharge path having a pick-up station and leading upwardly therefrom for discharge of the articles, an endless series of spaced-apart pick-up flights mounted to move past the pick-upstation, an article supporting and transfer member between said rail members and said discharge end to provide an article supporting bridge therebetween, and means for effecting an article feeding action of said transfer member in time with the operation of said flights.

15. In a feed apparatus for feeding a single file of articles while preventing locking of two adjacent articles together, a frame, trough means on said frame having a feed end and a discharge end, a pick-up means adjacent the discharge end of said trough means including rail members defining a discharge path having a pick-up station and leading upwardly therefrom for discharge of the articles, an endless series of spaced-apart pick-up flights mounted to move past the pick-up station, means providing for straight line of travel of said pick-up flights during the travel of a flight through said pick-up station, an article separating conveyor disposed in said trough, and having an inactive position where the conveyor does not engage articles in the trough and then having an active lifted position to engage the conveyor with articles in said trough, means for driving said conveyor to effect movement of the article engaging stretch thereof from the discharge toward the feed end of said trough, and means for periodically effecting lifting of said conveyor so as to periodically effect a drive of articles back up the trough to break any locking position between adjacent articles and produce a separated condition of the articles.

References Cited
UNITED STATES PATENTS

| | | | |
|---|---|---|---|
| 1,178,166 | 4/1916 | McCue et al. | 198—173 X |
| 1,214,506 | 2/1917 | Brasack | 198—220 |
| 2,889,911 | 6/1959 | Keesling | 198—26 |

ANDRES H. NEILSEN, *Primary Examiner.*